(12) United States Patent
Del Favero et al.

(10) Patent No.: US 8,751,292 B2
(45) Date of Patent: Jun. 10, 2014

(54) METHOD AND SYSTEM FOR PROVIDING SELLERS ACCESS TO SELECTED CONSUMERS

(75) Inventors: James Robert Del Favero, Mountain View, CA (US); Lisa Cohen Gevelber, Palo Alto, CA (US); John Reed Flora, Pleasanton, CA (US)

(73) Assignee: Intuit Inc., Mountain View, CA (US)

( * ) Notice: Subject to any disclaimer, the term of this patent is extended or adjusted under 35 U.S.C. 154(b) by 835 days.

(21) Appl. No.: 11/875,682

(22) Filed: Oct. 19, 2007

(65) Prior Publication Data

US 2009/0106144 A1  Apr. 23, 2009

(51) Int. Cl.
*G06Q 30/02* (2012.01)

(52) U.S. Cl.
CPC ..................................... *G06Q 30/02* (2013.01)
USPC .......................................................... 705/14

(58) Field of Classification Search
CPC ....................................................... G06Q 30/02
USPC .......................................................... 705/14
See application file for complete search history.

(56) References Cited

U.S. PATENT DOCUMENTS

| | | |
|---|---|---|
| 5,353,218 A | 10/1994 | De Lapa et al. |
| 5,754,938 A | 5/1998 | Herz et al. |
| 5,819,285 A | 10/1998 | Damico et al. |
| 6,341,353 B1 | 1/2002 | Herman et al. |
| 6,363,488 B1 | 3/2002 | Ginter et al. |
| 6,450,407 B1 | 9/2002 | Freeman et al. |
| 6,611,811 B1 | 8/2003 | Deaton et al. |
| 6,678,685 B2 | 1/2004 | McGill et al. |
| 6,918,131 B1 | 7/2005 | Rautila et al. |
| 7,403,906 B2 | 7/2008 | Coleman |
| 7,505,913 B2 | 3/2009 | Tobin |
| 7,668,747 B2 | 2/2010 | Murphy et al. |
| 7,783,532 B2 | 8/2010 | Hsu et al. |
| 7,877,402 B1 | 1/2011 | Weiss et al. |
| 2001/0003099 A1 | 6/2001 | Von Kohorn |
| 2001/0014868 A1 | 8/2001 | Herz et al. |
| 2001/0044751 A1 | 11/2001 | Pugliese, III et al. |

(Continued)

FOREIGN PATENT DOCUMENTS

| | | |
|---|---|---|
| GB | 2 430 297 | 3/2007 |
| JP | 2003-067606 | 3/2003 |

(Continued)

OTHER PUBLICATIONS

Gevelber et al., "Method and System for Finding and Providing Coupons to Consumers", U.S. Appl. No. 11/924,937, filed Oct. 26, 2007.

(Continued)

*Primary Examiner* — Jessica Lemieux

(74) *Attorney, Agent, or Firm* — Hawley Troxell Ennis & Hawley LLP; Philip McKay

(57) ABSTRACT

A method and system for providing sellers access to desirable consumers includes a process for providing sellers access to desirable consumers whereby financial transaction data for various consumers is obtained from one or more sources using a computing system implemented financial management system. The consumers' financial transaction data is then used by a provider of marketing and advertising tools to categorize consumers. Sellers are then charged for access to the consumers based on the consumer's category and/or historical financial transaction data and/or based on the consumer's eventual business with the seller as indicated by monitoring the consumers' financial transaction data.

13 Claims, 3 Drawing Sheets

(56) References Cited

U.S. PATENT DOCUMENTS

| | | |
|---|---|---|
| 2001/0049627 A1 | 12/2001 | Simpson |
| 2002/0002500 A1 | 1/2002 | Takahashi |
| 2002/0019764 A1 | 2/2002 | Mascarenhan |
| 2002/0040321 A1 | 4/2002 | Nicholson |
| 2002/0062249 A1 | 5/2002 | Iannacci |
| 2002/0077892 A1 | 6/2002 | Goring |
| 2002/0082620 A1 | 6/2002 | Lee |
| 2002/0138345 A1 | 9/2002 | Dickson et al. |
| 2002/0169664 A1 | 11/2002 | Walker et al. |
| 2002/0174011 A1 | 11/2002 | Sanchez et al. |
| 2003/0009402 A1 | 1/2003 | Mullen et al. |
| 2003/0018523 A1 | 1/2003 | Rappaport et al. |
| 2003/0093287 A1 | 5/2003 | Lowery |
| 2003/0105689 A1 | 6/2003 | Chandak et al. |
| 2003/0158844 A1 | 8/2003 | Kramer et al. |
| 2003/0195806 A1 | 10/2003 | Willman et al. |
| 2003/0212595 A1 | 11/2003 | Antonucci |
| 2003/0233276 A1 | 12/2003 | Pearlman et al. |
| 2004/0024638 A1 | 2/2004 | Restis |
| 2004/0049452 A1 | 3/2004 | Blagg |
| 2004/0054577 A1 | 3/2004 | Inoue et al. |
| 2004/0056101 A1 | 3/2004 | Barkan et al. |
| 2004/0140361 A1 | 7/2004 | Paul et al. |
| 2005/0171841 A1 | 8/2005 | Prorock et al. |
| 2005/0171955 A1 | 8/2005 | Hull et al. |
| 2005/0256756 A1 | 11/2005 | Lam et al. |
| 2006/0143183 A1 | 6/2006 | Goldberg et al. |
| 2006/0212355 A1 | 9/2006 | Teague et al. |
| 2006/0224451 A1 | 10/2006 | Kerschbrock et al. |
| 2006/0229946 A1* | 10/2006 | Scroggie et al. ......... 705/14 |
| 2006/0282310 A1* | 12/2006 | Burch ......... 705/14 |
| 2007/0050258 A1* | 3/2007 | Dohse ......... 705/14 |
| 2007/0094042 A1 | 4/2007 | Ramer et al. |
| 2007/0094114 A1 | 4/2007 | Bufford et al. |
| 2007/0106536 A1 | 5/2007 | Moore |
| 2007/0118394 A1 | 5/2007 | Cahoon |
| 2007/0121843 A1 | 5/2007 | Atazky et al. |
| 2007/0129998 A1 | 6/2007 | Postrel |
| 2007/0138270 A1 | 6/2007 | Reblin |
| 2007/0162337 A1 | 7/2007 | Hawkins et al. |
| 2007/0174116 A1 | 7/2007 | Keith et al. |
| 2007/0205274 A1 | 9/2007 | Bridges |
| 2007/0250380 A1 | 10/2007 | Mankoff |
| 2007/0288312 A1* | 12/2007 | Wang ......... 705/14 |
| 2008/0003987 A1 | 1/2008 | Mechaley |
| 2008/0071614 A1 | 3/2008 | Mebruer |
| 2008/0086365 A1 | 4/2008 | Zollino et al. |
| 2008/0154714 A1 | 6/2008 | Liu et al. |
| 2008/0195462 A1* | 8/2008 | Magdon-Ismail et al. ...... 705/10 |
| 2008/0195476 A1* | 8/2008 | Marchese et al. ......... 705/14 |
| 2009/0030787 A1 | 1/2009 | Pon et al. |
| 2009/0076912 A1 | 3/2009 | Rajan et al. |
| 2009/0319359 A1 | 12/2009 | Soza et al. |
| 2010/0042471 A1 | 2/2010 | Chang et al. |
| 2010/0159904 A1 | 6/2010 | Colligan et al. |

FOREIGN PATENT DOCUMENTS

| | | |
|---|---|---|
| WO | WO-01/40980 | 6/2001 |
| WO | WO-2004/055701 | 7/2004 |
| WO | WO-2005/122020 | 12/2005 |

OTHER PUBLICATIONS

Weiss et al., "Method and System for Using a Point-of Sale System to Correlate Transactions to a Coupon Database", U.S. Appl. No. 11/925,180, filed Oct. 26, 2007.

Weiss, "Method and System for Competitive Offer Targeting Using a Coupon Database", U.S. Appl. No. 11/930,884, filed Oct. 31, 2007.

Weiss et al., "Method and System for Coupon Distribution Based on Electronic Receipt Data", U.S. Appl. No. 11/963,534, filed Dec. 21, 2007.

Gevelber et al., "Method and System for Providing Relevant Coupons to Consumers Based on Financial Transaction History and Network Search Activity", U.S. Appl. No. 12/016,537, filed Jan. 18, 2008.

Weiss et al., "Method and System for Identifying and Marketing to Groups of Consumers Based on Financial Data", U.S. Appl. No. 12/019,069, filed Jan. 24, 2008.

Gevelber, "Method and System for Providing a Small Business Coupon Distribution System", U.S. Appl. No. 12/022,339, filed Jan. 30, 2008.

Weiss et al., "Method and System for Using Consumer Financial Data in Product Market Analysis", U.S. Appl. No. 12/059,878, filed Mar. 31, 2008.

Ferrell et al., "Method and System for Providing Consumers Incentive to Re-Distribute Marketing Devices", U.S. Appl. No. 12/107,946, filed Apr. 23, 2008.

Cassanego et al., "Method and System for Providing Dynamic Coupons", U.S. Appl. No. 12/323,846, filed Nov. 26, 2008.

Zackrison et al., "Method and System for Providing Coupon Recommendations", U.S. Appl. No. 12/323,888, filed Nov. 26, 2008.

Brown, Mark Graham, "Journal for Quality & Participation," Oct./Nov. 1994, 11 pages, v17n6, Association for Quality & Participation.

Gadd, Ken W, "Business Process Re-Engineering & Management Journal," 1995, 15 pages, v1n3, MCB UP Limited.

No author provided, "Convergys Corp. Named Frost & Sullivan Award Recipient," Apr. 1, 2002, 4 pages, PR Newswire.

Dalit, "Method and System for Sharing Marketing Devices," U.S. Appl. No. 12/960,764, filed Dec. 6, 2010.

Roper et al., "Method and System for Sharing Marketing Devices Based on Location Data," U.S. Appl. No. 13/218,144, filed Aug. 25, 2011.

Roth, "Get Rich Slowly: Personal Finance that Makes Cents", Mint.com, Nov. 14, 2007, 9 pages [online]. Retrieved on Jan. 3, 2012 from URL: <http://www.getrichslowly.org/blog/2007>.

Trent, "The Simple Dollar," Simple Dollar Online Personal Financial Analysis Tools, Jan. 31, 2008, 4 pages [online]. Retrieved on Jan. 3, 2012 from URL:<http://www.thesimpledollar.com/2008/01/31/online-personal-finance-analysis-tools-some-thoughts-on-quicken-online-mint-and-wesabe/>.

No author provided, "Mint.com Free Personal Finance Web-app is Now Live," Mint.com, Oct. 2007, 8 pages. [online], Retrieved from URL: <http://www.stopbuyingcrap.com/online-banking/mintcom-free-personal-finance-web-app-is-now-live/>.

No author provided, "Quicken 2006 Financial Planning Software," Official Quicken Site, 2 pages [online], Retrieved on Mar. 12, 2012 from URL: <http://web.archive.org/web/20051020000622/http://quicken.intuit.com/?>.

Channakeshava, "Method and System for Providing Purchase Recommendations and Offers that are Within a Consumer's Funding Limits," U.S. Appl. No. 13/755,412, filed Jan. 31, 2013.

* cited by examiner

METHOD AND SYSTEM FOR PROVIDING SELLERS ACCESS TO SELECTED CONSUMERS

BACKGROUND

Advertising and marketing represents a significant ongoing expense for most sellers and/or providers of consumer goods and services. Consequently, both sellers and providers of marketing and advertising tools are constantly looking for new ways to provide advertising to potential customers.

Typically, the sellers are willing to incur the expense of advertising in order to meet specific seller goals, including, but not limited to: to help build up a customer base; to get consumers into a store; to retain customers who find a lower price for an item from a competitor; to lure customers away from a competitor; and/or to help clear excess inventory and/or to boost sales of a given product.

Traditionally, advertising has been done through printed media, visual media, television, radio, etc. However, with the advent of the Internet and electronic commerce, several new avenues for advertising have also been opened, including general and content-based advertising, typically on websites, computing system applications, and Internet search engines. Currently, some providers of computing system implemented applications, search engines, and/or websites offer sellers of consumer goods and services the opportunity to place advertisements at strategic locations within the applications and/or websites. In some cases, these advertisements appear based on content and/or other criteria. In addition, in some instances, sellers of consumer goods and services are charged based on the number of potential customers that view the sellers advertise and/or link or "click" to the sellers website.

In order to most efficiently use their marketing and/or advertising resources, sellers would prefer to access consumers who have specific attributes that are particularly desirable to the seller. For instance, a seller may be particularly interested in targeting consumers who have a proven and/or historical spending record that indicates the consumer will be a particularly good find. As a specific example, a seller may be interested in targeting select consumers who shop with a competitor, or spend a threshold amount of money each month on products and/or services the seller offers. A seller may also be particularly interested in targeting select consumers of specific economic demographics, or who shop in a specific geographic location. In other instances, a seller may be particularly interested in targeting select consumers who meet any other criteria of interest.

Likewise, providers of marketing and advertising tools would like to be able to charge a premium to their clients, i.e., the sellers, for access to customers have proven spending histories, or who eventually turn out to be loyal and/or profitable customers of the seller.

In addition, most consumers would prefer to receive advertising that is relevant to the consumer, i.e., that is of use to the consumer and/or is directed to products and/or services the consumer uses.

Despite the desire of sellers, providers of marketing and advertising tools, as well as consumers, to create a better system for reaching desirable consumers, there currently is often no information, or limited information, available to the sellers and/or providers of marketing and advertising tools about a given consumer to enable the sellers and/or providers of marketing and advertising tools to accurately identify the consumer as a desirable, and/or probable, customer. In addition, even in the few cases where the limited information about a given consumer is available, the information is typically obtained from a single source, such as transactional data associated with a single credit card account, and is therefore incomplete, and the information is typically only available to larger retailers, advertisers and other sellers, such as the retailer offering the credit card account, that is the single source of information.

As a result of the situation discussed above, sellers are denied the ability to identify and target particularly desirable consumers, providers of marketing and advertising tools are denied the opportunity to profit by providing the sellers access to particularly desirable consumers, and consumers are also denied savings and efficiency that might otherwise be available to them. Consequently, the current situation represents a disservice to sellers, providers of marketing and advertising tools, as well as consumers.

SUMMARY

In accordance with one embodiment, a method and system for providing sellers access to desirable consumers includes a process for providing sellers access to desirable consumers whereby, in one embodiment, financial transaction data for various consumers is obtained from one or more sources, in one embodiment, using a computing system implemented financial management system. In one embodiment, the consumers' financial transaction data is then used by a provider of marketing and advertising tools to categorize consumers. Sellers are then charged for access to the consumers based, in one embodiment, on the consumer's category and/or historical financial transaction data and/or, in one embodiment, based on the consumer's eventual business with the seller as indicated by monitoring the consumers' financial transaction data.

In one embodiment, financial transaction data for various consumers is obtained from one or more sources, in one embodiment using a computing system implemented financial management system. In one embodiment, the consumers' financial transaction data is then used by a provider of marketing and advertising tools to categorize consumers based on one or more historically proven attributes as indicated by the consumer's financial transaction data. In one embodiment, the provider of marketing and advertising tools then offers sellers access to various consumers at a price based on the consumer's assigned category and/or historically proven attributes as indicated by the consumer's financial transaction data.

In one embodiment, a seller is given access to consumers by a provider of marketing and advertising tools, in one embodiment at an initial price that is typically relatively low or, in one embodiment, at no cost at all. The financial transaction data for consumers that the seller is provided access to is then obtained from one or more sources and periodically monitored, in one embodiment using a computing system implemented financial management system. In one embodiment, the seller is then charged an additional amount for consumers that make purchases from the seller, as indicated by the consumer's financial transaction data. In one embodiment, the additional amount paid by the seller is tiered based on the amount of business a consumer provides to the seller.

Using the method and system for providing sellers access to desirable consumers disclosed herein, in one embodiment, the consumer's financial transaction data is used to identify particularly valuable consumers for a given seller and then the seller is charged a premium for access to that consumer. This is advantageous to both the providers of marketing and advertising tools, since they are able to charge more for access to desirable consumers, and to the seller, since the seller is provided access to these desirable consumers.

In addition, in one embodiment, sellers are given access to various "unproven" consumers at a relatively low price and then are charged based on actual spending on the part of a given consumer as indicated by the consumer's financial transaction data. This too is advantageous to both the providers of marketing and advertising tools, since they are able to charge more for "proven" consumers, and to the seller, since the seller is provided access to a variety of consumers relatively cheaply and then only charged a premium for actual business generated.

As discussed in more detail below, using the below embodiments, with little or no modification and/or user input, there is considerable flexibility, adaptability, and opportunity for customization to meet the specific needs of various users under numerous circumstances.

Figure 1:
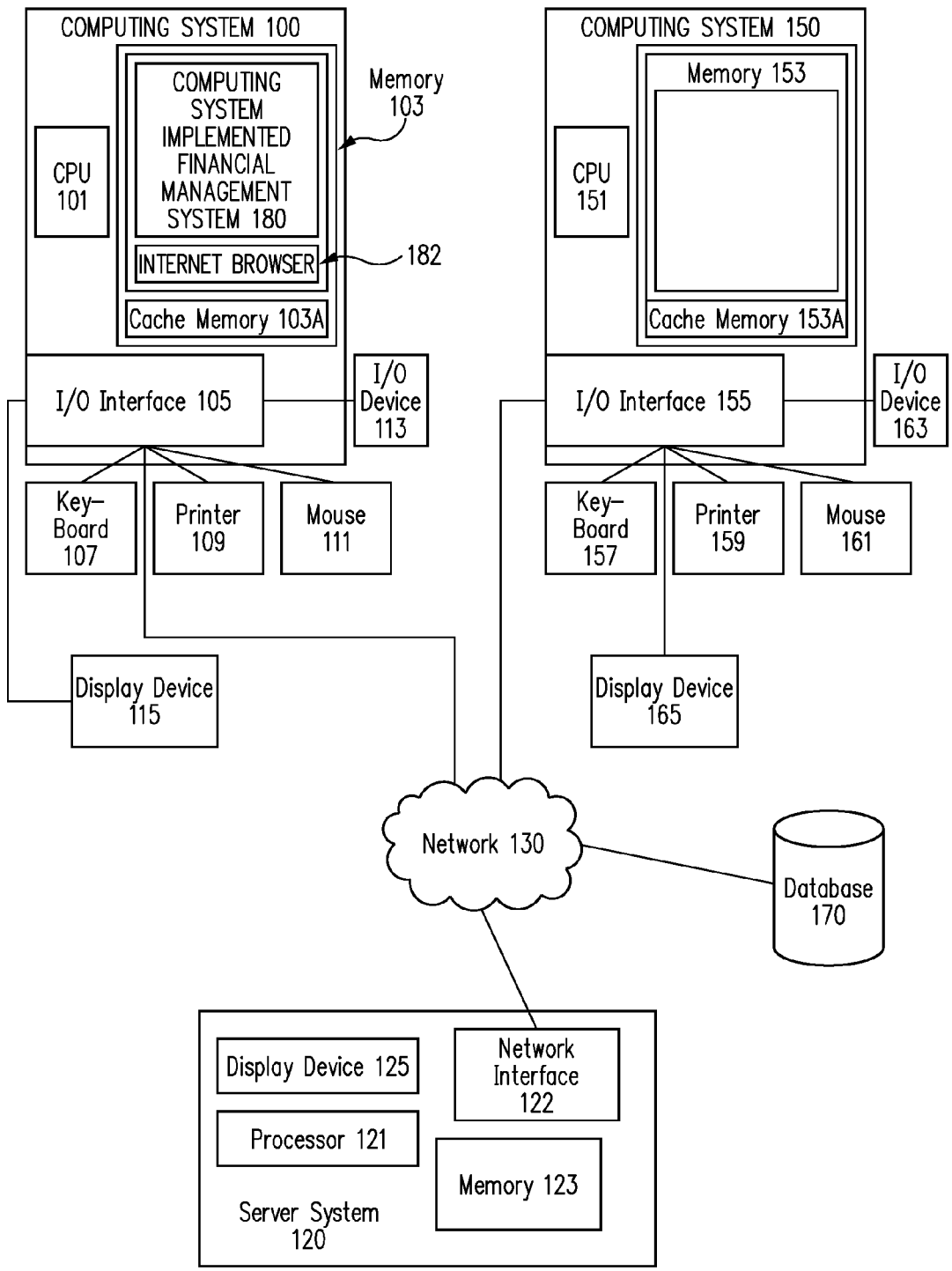
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

For illustrative purposes, some embodiments are described herein within the framework of, and using, one or more computing system implemented financial management systems. Various specific details are discussed below, and shown in the accompanying FIG.s, to aid one of skill in the art in understanding the invention. However, such specific details are intended to be illustrative only, and are not intended to restrict in any way the scope as claimed herein. In addition, the particular terminology used herein is intended to be illustrative and exemplary only, and in no way limits the scope as claimed.

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether known at the time of filing or as developed later. Some embodiments are implemented in a mobile computing system running mobile operating systems such as Symbian® OS, Windows® Mobile, or any other operating system designed to generally manage operations on a mobile computing system, whether known at the time of filing or as developed later. As described more fully below, embodiments can be implemented on computing systems other than a conventional computing system such as, for example, a personal digital assistant, a cell phone, or other computing system capable of processing computer readable data, whether known at the time of filing or as developed later. Computing systems also include those in which one or more computing resources (hardware or software) are located remotely and accessed via network, such as a Local Area Network (LAN), Wide Area Network (WAN), a public network, such as the Internet, a private network, a combination of network types, a computing system bus, or other electronic medium in which data may be exchanged between one computing system and one or more other computing system(s), whether known at the time of filing or as developed later. Embodiments may be included as add-on software for existing software programs, packages or applications, and embodiments may be a feature of an application that is bundled with a computing system or sold separately. Some embodiments may also be implemented as functionality embedded in hardware devices and systems.

Output generated by one or more embodiments can be displayed on a display screen, delivered from a website and/or web-based function, transmitted to a remote device, stored on any database, computer server or other storage mechanism, printed, or used in any other way. In addition, in some embodiments, processes and/or systems described herein may make use of input provided to the computer device implementing a process and/or application, discussed herein, via user interface devices such as a keyboard, mouse, touchpad, or any other device capable of providing user input to a computing system or for translating user actions into computing system operations, whether known at the time of filing or as developed later.

Hardware System Architecture

FIG. 1 is a block diagram of an exemplary hardware architecture for implementing one embodiment of a system and method for providing sellers access to desirable consumers, such as exemplary processes 200 and 300 discussed herein, that includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part of, a computing system implemented financial management system 180 such as, but not limited to: a computing system implemented personal financial management system; a computing system implemented business financial management system; a computing system implemented personal accounting system; a computing system implemented business accounting system; a computing system implemented tax preparation system; a computing system implemented healthcare management system; or any other computing system implemented personal and/or business data management system. In one embodiment, computing system implemented financial management system 180 is stored, in whole, or in part, in memory system 103, and is used by, or includes, as discussed below, a process for providing sellers access to desirable consumers, such as exemplary processes 200 and 300 discussed below.

Computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for providing sellers access to desirable consumers and/or a computing system implemented financial management system is entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser and/or access capability 182 that, in one embodiment, is stored, in whole, or in part in memory 103.

In one embodiment, computing system 100 is a computing system accessible by a provider of marketing and advertising tools and/or a consumer and is used and/or accessible by another computing system, such as computing system 150 (discussed below), a workstation, a two-way pager, a cellular telephone, a smart phone, a digital wireless telephone, a Personal Digital Assistant (PDA), a server computer, an Internet appliance, any other device, or any desired combination of these devices, that includes components that can execute all, or part, of a process for providing sellers access to desirable consumers, and/or a computing system implemented financial management system, in accordance with at least one of the embodiments as described herein.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 is accessible by a provider of marketing and advertising tools and, in one embodiment, memory system 153 includes all, or part of, data representing one or more consumers and/or their associated financial transaction data, such as, those discussed below.

As discussed in more detail below, in one embodiment, all, or part of, a process for providing sellers access to desirable consumers, and/or a computing system implemented financial management system, can also be loaded, in whole, or in part, into computing system 150 from computing system 100 for storage in memory system 153 and/or cache memory 153A.

Also shown in FIG. 1 is exemplary database 170. In one embodiment, database 170 is a data storage device, a designated server system or computing system, or a designated portion of one or more server systems or computing systems, such as computing systems 100, 150 and 120, or a distributed database, or an external and/or portable hard drive. In one embodiment, database 170 is a dedicated mass storage device implemented in software, hardware, or a combination of hardware and software. In one embodiment, database 170 is a web-based function. As discussed in more detail below, in one embodiment, database 170 is under the control of the consumer, and/or the consumer's agents, one or providers of marketing and advertising tools, and/or a process for providing sellers access to desirable consumers, such as exemplary processes 200 and 300, and/or a computing system implemented process, such as a computing system implemented financial management system 180.

In one embodiment, database 170 is used, controlled, and/or accessible by, a provider of and/or a system and process for providing sellers access to desirable consumers, such as processes for providing sellers access to desirable consumers 200 and/or 300, and data representing all, or part, of a consumer's financial data is stored in database 170, typically in accounts associated with a given consumer. In one embodiment, database 170 is used, controlled, and/or accessible by, a provider of and/or a computing system implemented financial management system, such as a computing system implemented financial management system 180, and data representing all, or part, of a consumer's financial data is stored in database 170, typically in accounts associated with a given consumer. In one embodiment, database 170 is used, controlled, and/or accessible by, one or more providers of marketing and advertising tools and data representing all, or part, of a consumer's financial data is stored in database 170, typically in accounts associated with a given consumer.

In one embodiment, computing systems 100 and 150, and database 170, are coupled to a server system 120 through network 130. In one embodiment, server system 120 typically includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, server system 120 is used, controlled, and/or accessible by, a provider of and/or a system and process for providing sellers access to desirable consumers, such as processes for providing sellers access to desirable consumers 200 and/or 300, and data representing all, or part, of a consumer's financial data is stored in server system 120, typically in accounts associated with a given consumer. In one embodiment, server system 120 is used, controlled, and/or accessible by, a provider of and/or a computing system implemented financial management system, such as a computing system implemented financial management system 180, and data representing all, or part, of a consumer's financial data is stored in server system 120, typically in accounts associated with a given consumer. In one embodiment, server system 120 is used, controlled, and/or accessible by, one or more providers of marketing and advertising tools and data representing all, or part, of a consumer's financial data is stored in server system 120, typically in accounts associated with a given consumer.

Network 130 can be any network or network system that is of interest to a user such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network, as discussed herein. In addition, the particular type of, and configuration of, computing systems 100 and 150, database 170, and server system 120 are not relevant.

As discussed in more detail below, in one embodiment, a process for providing sellers access to desirable consumers, such as processes for providing sellers access to desirable consumers 200 and/or 300, and/or a computing system implemented financial management system, such as a computing system implemented financial management system 180, and/or data representing one or more consumers' financial transaction data, are stored, in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for providing sellers access to desirable consumers, such as processes for providing sellers access to desirable consumers 200 and/or 300, and/or a computing system implemented financial management system, such as computing system implemented financial management system 180, are sometimes referred to herein, alternatively, as a process, an application, a module, a program, a component of a software system, a component of a software package, a component of a parent system, a plug-in, or a feature of a parent system, this terminology is illustrative only. In some embodiments, a process for providing sellers access to desirable consumers, such as processes for providing sellers access to desirable consumers 200 and/or 300, and/or a computing system implemented financial management system, such as a computing system implemented financial management system 180, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, a process for providing sellers access to desirable consumers, such as processes for providing sellers access to desirable consumers 200 and/or 300, and/or a computing system implemented financial management system, such as a computing system implemented financial management system 180, and/or data representing the one or more consumers and/or their associated financial transaction data, such as discussed below, are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

For example, all, or part, of a process for providing sellers access to desirable consumers, such as processes for providing sellers access to desirable consumers 200 and/or 300, and/or a computing system implemented financial management system, such as a computing system implemented financial management system 180, and/or data representing the one or more consumers and/or their associated financial transaction data, may be stored in a memory that is physically located in a location, such as server system memory 123, or database 170, of FIG. 1, different from a computing system, such as computing systems 100 and/or 150 of FIG. 1, utilizing a process for providing sellers access to desirable consumers, and/or a computing system implemented financial management system, and/or data representing the one or more consumers and/or their associated financial transaction data, such as discussed below. In one embodiment, all, or part, of a process for providing sellers access to desirable consumers, and/or a computing system implemented financial management system, and/or data representing one or more consumers' financial transaction data, may be stored in a memory that is physically located, separate from the computing system's processor(s), such as CPUs 101 and 151 of FIG. 1, and the computing system CPUs can be coupled to the memory in a client-server system, such as server system 120 of FIG. 1, or, alternatively, via connection to another computer, such as computing systems 100, 150 of FIG. 1, via modems and analog lines, digital interfaces and a digital carrier line, or wireless or cellular connections.

In one embodiment, the computing systems and/or server systems, such as computing systems 100 and/or 150 and/or server system 120 of FIG. 1, running and/or utilizing and/or storing all, or part, of a process for providing sellers access to desirable consumers, such as processes for providing sellers access to desirable consumers 200 and/or 300, and/or a computing system implemented financial management system, such as a computing system implemented financial management system 180, and/or data representing the one or more consumers and/or their associated financial transaction data, such as discussed below, is a portable computer, a workstation, a two-way pager, a cellular telephone, a smart phone, a digital wireless telephone, a PDA, a server computer, an Internet appliance, or any other device that includes components that can execute all, or part, of a process for providing sellers access to desirable consumers, and/or a computing system implemented financial management system, in accordance with at least one of the embodiments as described herein. Similarly, in another embodiment, a process for providing sellers access to desirable consumers, and/or a computing system implemented financial management system, and/or data representing the one or more consumers and/or their associated financial transaction data, may be implemented on, and/or run, and/or stored on, a computing system and/or server system that is comprised of multiple different computers, wireless devices, cellular telephones, digital telephones, two-way pagers, personal digital assistants, server computers, or any desired combination of these devices, that are coupled to perform the processes and/or operations as described herein.

Process

Herein, the terms "consumer", "individual", "user", and/or "customer" are used interchangeably to denote any party that a seller wishes to access using a process for providing sellers access to desirable consumers, and/or a person who is the subject of, source of, and/or target of, all, or part of, any data/information obtained by a process for providing sellers access to desirable consumers, and/or a legal guardian of a person who is the subject of, and/or target of, any data/information obtained by a process for providing sellers access to desirable consumers, and/or an authorized agent of any party that a seller wishes to access using a process for providing sellers access to desirable consumers, and/or a person who is the subject of, and/or target of, any information obtained by a process for providing sellers access to desirable consumers, and/or any other authorized party associated with any party that a seller wishes to access using a process for providing sellers access to desirable consumers, and/or a person who is the subject of, and/or target of, any information obtained by a process for providing sellers access to desirable consumers.

As used herein, the term seller includes, but is not limited to: a provider of goods; a provider of services; a party desiring to access a consumer; or any other party desiring to access a consumer.

As used herein, a provider of marketing and advertising tools is any party offering and/or providing a seller access to a consumer.

As used herein, the term computing system implemented financial management system includes, but is not limited to: computing system implemented personal and small business financial management systems, packages, programs, modules, or applications; computing system implemented business systems, packages, programs, modules, or applications; computing system implemented tax preparation systems, packages, programs, modules, or applications; computing system implemented accounting and/or invoicing systems, packages, programs, modules, or applications; and various other electronic data management systems, packages, programs, modules, or applications, whether known at the time of filling or as developed later.

In accordance with one embodiment, a method and system for providing sellers access to desirable consumers includes a process for providing sellers access to desirable consumers whereby, in one embodiment, financial transaction data for various consumers is obtained from one or more sources, in one embodiment, using a computing system implemented financial management system. In one embodiment, the consumers' financial transaction data is then used by a provider of marketing and advertising tools to categorize consumers. Sellers are then charged for access to the consumers based, in one embodiment, on the consumer's category and/or historical financial transaction data and/or, in one embodiment, based on the consumer's eventual business with the seller as indicated by monitoring the consumers' financial transaction data.

In one embodiment, financial transaction data for various consumers is obtained from one or more sources, in one embodiment using a computing system implemented financial management system. In one embodiment, the consumers' financial transaction data is then used to categorize consumers based on the one or more historically proven attributes as indicated by the consumer's financial transaction data. In one embodiment, a seller is then offered access to select consumers at a price based on the consumer's assigned category and/or historically proven attributes as indicated by the consumer's financial transaction data.

Figure 2:
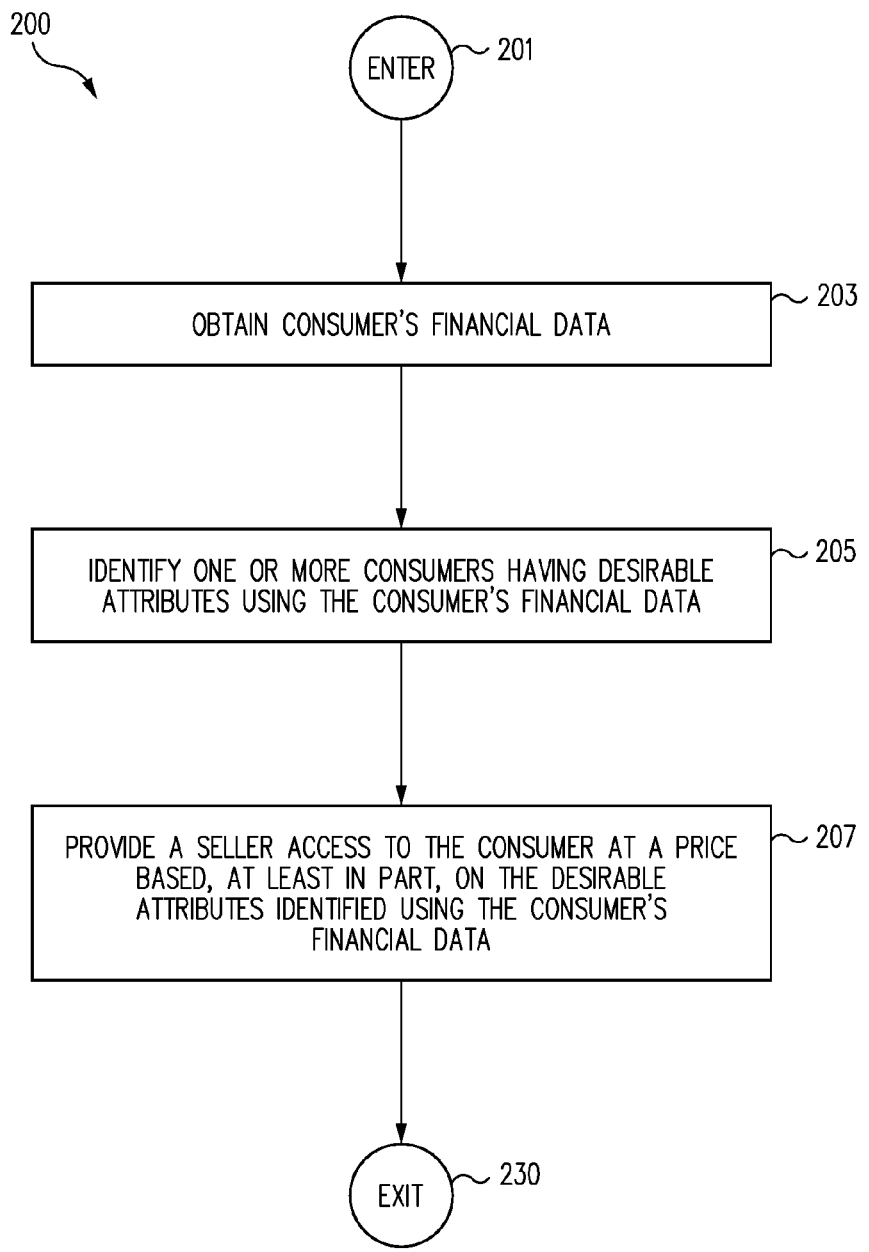
FIG. 2 is a flow chart depicting a process for providing sellers access to desirable consumers in accordance with one embodiment.

FIG. 2 a flow chart depicting a process for providing sellers access to desirable consumers 200 in accordance with one embodiment. Process for providing sellers access to desirable consumers 200 begins at ENTER OPERATION 201 of FIG. 2 and process flow proceeds to OBTAIN CONSUMER'S FINANCIAL DATA OPERATION 203.

In one embodiment, at OBTAIN CONSUMER'S FINANCIAL DATA OPERATION 203 financial data representing various financial transactions conducted by a given consumer is obtained by process for providing sellers access to desirable consumers 200 using, and/or through, and/or from, a computing system implemented financial management system.

In one embodiment, the data representing financial transactions conducted by a given consumer obtained at OBTAIN CONSUMER'S FINANCIAL DATA OPERATION 203 includes data associated with financial transactions conducted using multiple payment methods and/or accounts to provide as complete a set of consumer financial data as possible. For instance, in one embodiment, the consumer's financial transaction data is obtained at OBTAIN CONSUMER'S FINANCIAL DATA OPERATION 203 from, but not limited to, any one or more of the following sources: banks; debit cards and/or accounts; credit unions; credit cards and/or accounts and/or credit card/account providers; asset accounts and/or asset account providers; or other financial resources, accounts and/or services used by a consumer to pay for and/or conduct financial transactions.

In addition, in some embodiments, the consumer's financial transaction data obtained at OBTAIN CONSUMER'S FINANCIAL DATA OPERATION 203 is obtained from multiple sources of the same type. For instance, in one embodiment, the consumer's financial transaction data is obtained at OBTAIN CONSUMER'S FINANCIAL DATA OPERATION 203 from: two or more banks; two or more debit cards and/or accounts; two or more credit unions; two or more credit cards and/or accounts and/or credit card/account providers; two or more asset accounts and/or asset account providers; and/or two or more other financial resources, accounts and/or services used by a consumer to pay for and/or conduct financial transactions.

As noted above, in one embodiment, all, or part, of the consumer's financial transaction data is obtained by process for providing sellers access to desirable consumers 200 at OBTAIN CONSUMER'S FINANCIAL DATA OPERATION 203 from, or using, a computing system implemented financial management system, such as computing system implemented financial management system 180, that implements, includes, is accessed by, and/or is otherwise associated with process for providing sellers access to desirable consumers 200 (FIG. 2).

Currently, various computing system implemented financial management systems are available including: computing system implemented personal financial management systems; computing system implemented small business financial management systems; computing system implemented home inventory systems; computing system implemented tax preparation systems; computing system implemented business accounting systems; and computing system implemented medical expense management systems; as well as various other electronic data driven financial management systems.

Computing system implemented financial management systems typically help consumers/users manage their finances by providing a centralized interface with banks, credit card companies, and other various financial institutions and/or accounts, for identifying, processing, storing, and categorizing consumer financial transactions and other consumer financial data. Currently, computing system implemented financial management systems typically obtain financial transaction information, such as payee identification, payee location, payment amount, date of the transaction, time of transaction, items purchased, the type of transaction, etc., via communication with banks, credit card providers, or other financial institutions, using electronic data transfer systems such as the Open Financial Exchange (OFX) specification, Web Direct, or various other systems for transferring financial transaction data.

As noted above, using computing system implemented financial management systems, the financial transaction information, payee identification, payee location, payment amount, date of the transaction, and other data is often used by the computing system implemented financial management system to categorize individual financial transactions as a particular type of income or expense. Some currently offered computing system implemented financial management systems then use this financial transaction information to track events, such as purchase events, and to provide various historical data reports or displays including "to date" data reports such as historical spending data reports in one or more particular categories.

In one embodiment, the consumer's financial transaction data obtained using one or more computing system implemented financial management systems is transferred, or otherwise made available to, process for providing sellers access to desirable consumers 200 at OBTAIN CONSUMER'S FINANCIAL DATA OPERATION 203.

In one embodiment, all, or part, of the consumer's financial transaction data is obtained by process for providing sellers access to desirable consumers 200 at OBTAIN CONSUMER'S FINANCIAL DATA OPERATION 203 from invoices/bills and/or receipt data provided to process for providing sellers access to desirable consumers 200, and/or an associated computing system implemented financial management system, by one or more merchants and/or product and/or service providers. In one embodiment, the invoice/bill and/or receipt data includes "level 3" data indicating, among other things, the line item entry and product and/or service identification for each item purchased in the transaction.

As noted above, in one embodiment, process for providing sellers access to desirable consumers 200 is associated with a computing system implemented financial management system, such as computing system implemented financial management system 180 of FIG. 1, that implements, includes, is accessed by, and/or is otherwise associated with process for providing sellers access to desirable consumers 200 (FIG. 2). Some of these computing system implemented financial management systems provide the capability to obtain, receive, and/or process electronic copies of the invoices/receipts from one or more merchants and/or product and/or service providers, often in their specific formats, and then store the data for use by process for providing sellers access to desirable consumers 200 in one of numerous locations by one of numerous methods known to those of skill in the art and/or as discussed herein.

In one embodiment, all, or part, of the consumer's financial transaction data is obtained by process for providing sellers access to desirable consumers 200, and/or a computing system implemented financial management system, at OBTAIN CONSUMER'S FINANCIAL DATA OPERATION 203 from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to pay for and/or conduct financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to pay for and/or conduct financial transactions.

In one embodiment, all, or part, of the consumer's financial transaction data is obtained by process for providing sellers access to desirable consumers 200 at OBTAIN CONSUMER'S FINANCIAL DATA OPERATION 203 from user input through a user interface device such as keyboard 107, 157, mouse 111, 161 of FIG. 1 or a touchpad, voice command recognition system, or any other device capable of providing user input to a computing system or for translating user actions into computing system operations, whether available or known at the time of filing or as developed later.

Returning to FIG. 2, in one embodiment, all, or part, of the consumer's financial transaction data is obtained by process for providing sellers access to desirable consumers 200 at OBTAIN CONSUMER'S FINANCIAL DATA OPERATION 203 from any combination of the above sources and/or from any other source of a consumer's financial data whether known at the time of filing or as developed thereafter.

In one embodiment, once the consumer's financial data is obtained at OBTAIN CONSUMER'S FINANCIAL DATA OPERATION 203, the data is stored in whole, or in part, in a database maintained by, accessible by, owned by, or otherwise related to: process for providing sellers access to desirable consumers 200, and/or a provider of process for providing sellers access to desirable consumers 200; a computing system implemented financial management system, and/or a provider of a computing system implemented financial management system; one or more sellers; or any other party, by any one of the numerous mechanisms known to those of skill in the art. For instance, in one embodiment, the data, in whole, or in part, is stored in a memory system, such as memory systems 103 and 153 or server memory system 123, or database 170, of FIG. 1, or in a cache memory, such as cache memories 103A/153A of FIG. 1, or in any main memory or mass memory, associated with a computing system, such as computing systems 100 or 150 described above. In one embodiment, the data, in whole, or in part, is stored in any computing system and/or server system, such as computing systems 100 or 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the consumer's financial data stored as described above is maintained, in whole, or in part, by: process for providing sellers access to desirable consumers 200, and/or a provider of process for providing sellers access to desirable consumers 200; a computing system implemented financial management system, and/or a provider of a computing system implemented financial management system; one or more providers of marketing and advertising tools; a third party data storage institution; any third party service or institution; or any other parties. In these embodiments, access to the consumer's financial data is then provided to process for providing sellers access to desirable consumers 200, and/or a computing system implemented financial management system, by providing access to the data and/or providing the data on a computer program product.

In one embodiment, once financial data representing various financial transactions conducted by a given consumer is obtained by process for providing sellers access to desirable consumers 200 using/from a computing system implemented financial management system at OBTAIN CONSUMER'S FINANCIAL DATA OPERATION 203, process flow proceeds to IDENTIFY ONE OR MORE CONSUMERS HAVING DESIRABLE ATTRIBUTES USING THE CONSUMER'S FINANCIAL DATA OPERATION 205.

In one embodiment, at IDENTIFY ONE OR MORE CONSUMERS HAVING DESIRABLE ATTRIBUTES USING THE CONSUMER'S FINANCIAL DATA OPERATION 205 the consumer's financial data obtained at OBTAIN CONSUMER'S FINANCIAL DATA OPERATION 203 is used to identify consumers having desirable spending and/or financial attributes and/or to categorize consumers based, at least in part, on the consumer's financial transaction data and/or derived spending habits.

In one embodiment, at IDENTIFY ONE OR MORE CONSUMERS HAVING DESIRABLE ATTRIBUTES USING THE CONSUMER'S FINANCIAL DATA OPERATION 205 the consumer's financial data obtained at OBTAIN CONSUMER'S FINANCIAL DATA OPERATION 203 is analyzed and various consumer attributes are used to identify particularly desirable consumers and/or categorized consumers according to these attributes.

For instance, in one embodiment, at IDENTIFY ONE OR MORE CONSUMERS HAVING DESIRABLE ATTRIBUTES USING THE CONSUMER'S FINANCIAL DATA OPERATION 205 the consumers' financial data obtained at OBTAIN CONSUMER'S FINANCIAL DATA OPERATION 203 is used to identify desirable consumers based on previous purchases and amounts spent in general, i.e., an analysis of discretionary or other spending by a given consumer.

As another example, in one embodiment, at IDENTIFY ONE OR MORE CONSUMERS HAVING DESIRABLE ATTRIBUTES USING THE CONSUMER'S FINANCIAL DATA OPERATION 205 the consumers' financial data obtained at OBTAIN CONSUMER'S FINANCIAL DATA OPERATION 203 is used to identify desirable consumers based on previous purchases from one or more identified product and/or service providers.

As another example, in one embodiment, at IDENTIFY ONE OR MORE CONSUMERS HAVING DESIRABLE ATTRIBUTES USING THE CONSUMER'S FINANCIAL DATA OPERATION 205 the consumers' financial data obtained at OBTAIN CONSUMER'S FINANCIAL DATA OPERATION 203 is used to identify desirable consumers based on the consumer spending a defined threshold amount of money in a defined time frame in a specific category of store, such as $100.00 or more per month in a specific category of store.

As another example, in one embodiment, at IDENTIFY ONE OR MORE CONSUMERS HAVING DESIRABLE ATTRIBUTES USING THE CONSUMER'S FINANCIAL DATA OPERATION 205 the consumers' financial data obtained at OBTAIN CONSUMER'S FINANCIAL DATA OPERATION 203 is used to identify desirable consumers based on the consumer spending a defined threshold amount of money in a defined time frame on specific products and/or services, such as $100.00 or more per month on specific products and/or services.

As another example, in one embodiment, at IDENTIFY ONE OR MORE CONSUMERS HAVING DESIRABLE ATTRIBUTES USING THE CONSUMER'S FINANCIAL DATA OPERATION 205 the consumers' financial data obtained at OBTAIN CONSUMER'S FINANCIAL DATA OPERATION 203 is used to identify desirable consumers based on the consumer shopping with a seller, or other identified product and/or service providers, a threshold number of times over a defined time frame, such as regular customer's of a seller or consumers who shop 3 times or more a month at an identified product and/or service provider.

As another example, in one embodiment, at IDENTIFY ONE OR MORE CONSUMERS HAVING DESIRABLE ATTRIBUTES USING THE CONSUMER'S FINANCIAL DATA OPERATION 205 the consumers' financial data obtained at OBTAIN CONSUMER'S FINANCIAL DATA OPERATION 203 is used to identify desirable consumers based on the consumer having recently purchased specific products and/or services, such as products and/or services related to the products and/or services offered by the seller.

As another example, in one embodiment, at IDENTIFY ONE OR MORE CONSUMERS HAVING DESIRABLE ATTRIBUTES USING THE CONSUMER'S FINANCIAL DATA OPERATION 205 the consumers' financial data obtained at OBTAIN CONSUMER'S FINANCIAL DATA OPERATION 203 is used to identify desirable consumers based on the consumer shopping in a defined geographic location.

As another example, in one embodiment, at IDENTIFY ONE OR MORE CONSUMERS HAVING DESIRABLE ATTRIBUTES USING THE CONSUMER'S FINANCIAL DATA OPERATION 205 the consumers' financial data obtained at OBTAIN CONSUMER'S FINANCIAL DATA OPERATION 203 is used to identify desirable consumers based on any other criteria desired/defined by the provider of process for providing sellers access to desirable consumers 200 and/or the provider and/or a computing system implemented financial management system associated with process for providing sellers access to desirable consumers 200.

The specific analysis, criteria and examples discussed above are but a few specific examples of possible ways that at IDENTIFY ONE OR MORE CONSUMERS HAVING DESIRABLE ATTRIBUTES USING THE CONSUMER'S FINANCIAL DATA OPERATION 205 the consumers' financial data obtained at OBTAIN CONSUMER'S FINANCIAL DATA OPERATION 203 is used to identify desirable consumers. In other embodiments, any other analysis and/or criteria, or combination of data and/or criteria, considered desirable by the provider of process for providing sellers access to desirable consumers 200, and/or the provider and/or a computing system implemented financial management system associated with process for providing sellers access to desirable consumers 200, and/or a consumer, and/or a seller, and/or providers of marketing and advertising tools, can be defined at IDENTIFY ONE OR MORE CONSUMERS HAVING DESIRABLE ATTRIBUTES USING THE CONSUMER'S FINANCIAL DATA OPERATION 205.

In one embodiment, once the consumer's financial data obtained at OBTAIN CONSUMER'S FINANCIAL DATA OPERATION 203 is used to identify consumers having desirable spending and/or financial attributes and/or to categorize consumers based, at least in part, on the consumer's financial transaction data and/or derived spending habits at IDENTIFY ONE OR MORE CONSUMERS HAVING DESIRABLE ATTRIBUTES USING THE CONSUMER'S FINANCIAL DATA OPERATION 205 process flow proceeds to PROVIDE A SELLER ACCESS TO THE CONSUMER AT A PRICE BASED, AT LEAST IN PART, ON THE DESIRABLE ATTRIBUTES IDENTIFIED USING THE CONSUMER'S FINANCIAL DATA OPERATION 207.

In one embodiment, at PROVIDE A SELLER ACCESS TO THE CONSUMER AT A PRICE BASED, AT LEAST IN PART, ON THE DESIRABLE ATTRIBUTES IDENTIFIED USING THE CONSUMER'S FINANCIAL DATA OPERATION 207, one or more sellers are provided access to one or more of the consumers of IDENTIFY ONE OR MORE CONSUMERS HAVING DESIRABLE ATTRIBUTES USING THE CONSUMER'S FINANCIAL DATA OPERATION 205 by charging the sellers an amount based, in one embodiment, at least in part, on the consumer's category, and/or attributes, and/or historical financial transaction data, as determined at IDENTIFY ONE OR MORE CONSUMERS HAVING DESIRABLE ATTRIBUTES USING THE CONSUMER'S FINANCIAL DATA OPERATION 205.

In one embodiment, at PROVIDE A SELLER ACCESS TO THE CONSUMER AT A PRICE BASED, AT LEAST IN PART, ON THE DESIRABLE ATTRIBUTES IDENTIFIED USING THE CONSUMER'S FINANCIAL DATA OPERATION 207, one or more sellers are provided access to one or more of the consumers of IDENTIFY ONE OR MORE CONSUMERS HAVING DESIRABLE ATTRIBUTES USING THE CONSUMER'S FINANCIAL DATA OPERATION 205 by providing the seller advertisement avenues and/or advertising space.

As noted above, traditionally, advertising has been done through printed media, visual media, television, radio, etc. In these instances, using process for providing sellers access to desirable consumers 200, at PROVIDE A SELLER ACCESS TO THE CONSUMER AT A PRICE BASED, AT LEAST IN PART, ON THE DESIRABLE ATTRIBUTES IDENTIFIED USING THE CONSUMER'S FINANCIAL DATA OPERATION 207 the seller would be charged for access to various consumers based, at least in part, on the category, and/or attributes, and/or historical financial transaction data of the consumers who will receive the advertising as determined at IDENTIFY ONE OR MORE CONSUMERS HAVING DESIRABLE ATTRIBUTES USING THE CONSUMER'S FINANCIAL DATA OPERATION 205.

As also noted above, with the advent of the Internet and electronic commerce, several new avenues for advertising have also been opened, including general and content-based advertising, typically on websites, computing system applications, and Internet search engines. Currently, some providers of computing system implemented applications, search engines, and/or websites offer sellers of consumer goods and services the opportunity to place advertisements at strategic locations within the applications and/or websites. In some cases, these advertisements appear based on content and/or other criteria. In addition, in some instances, sellers of consumer goods and services are charged based on the number of potential customers that view the sellers advertise and/or link or "click" to the sellers website. In these instances, using process for providing sellers access to desirable consumers 200, at PROVIDE A SELLER ACCESS TO THE CONSUMER AT A PRICE BASED, AT LEAST IN PART, ON THE DESIRABLE ATTRIBUTES IDENTIFIED USING THE CONSUMER'S FINANCIAL DATA OPERATION 207 the seller is charged for access to various consumers based, at least in part, on the category, and/or attributes, and/or historical financial transaction data of the consumers who will receive the advertising as determined at IDENTIFY ONE OR MORE CONSUMERS HAVING DESIRABLE ATTRIBUTES USING THE CONSUMER'S FINANCIAL DATA OPERATION 205.

In one embodiment, an owner of a website is the provider of marketing and advertising tools and/or the user of process for providing sellers access to desirable consumers 200. In this instance, in one embodiment at PROVIDE A SELLER ACCESS TO THE CONSUMER AT A PRICE BASED, AT LEAST IN PART, ON THE DESIRABLE ATTRIBUTES IDENTIFIED USING THE CONSUMER'S FINANCIAL DATA OPERATION 207, the website owner provides the seller advertisement space within the website in a consumers account on the website for a price based, at least in part, on the category, and/or attributes, and/or historical financial transaction data of the consumer who will receive the advertising as determined at IDENTIFY ONE OR MORE CONSUMERS HAVING DESIRABLE ATTRIBUTES USING THE CONSUMER'S FINANCIAL DATA OPERATION 205.

In one embodiment, an owner of a search engine is the provider of marketing and advertising tools and/or the user of process for providing sellers access to desirable consumers 200. In this instance, in one embodiment, at PROVIDE A SELLER ACCESS TO THE CONSUMER AT A PRICE BASED, AT LEAST IN PART, ON THE DESIRABLE ATTRIBUTES IDENTIFIED USING THE CONSUMER'S FINANCIAL DATA OPERATION 207, the search engine owner provides the seller advertisement space within the search engine results for a price based, at least in part, on the category, and/or attributes, and/or historical financial transaction data of the consumer who will receive the advertising as determined at IDENTIFY ONE OR MORE CONSUMERS HAVING DESIRABLE ATTRIBUTES USING THE CONSUMER'S FINANCIAL DATA OPERATION 205.

In one embodiment, the provider of the computing system implemented financial management system used to obtain the consumers financial data at OBTAIN CONSUMER'S FINANCIAL DATA OPERATION 203 is the provider of marketing and advertising tools and/or process for providing sellers access to desirable consumers 200. In this instance, in one embodiment, at PROVIDE A SELLER ACCESS TO THE CONSUMER AT A PRICE BASED, AT LEAST IN PART, ON THE DESIRABLE ATTRIBUTES IDENTIFIED USING THE CONSUMER'S FINANCIAL DATA OPERATION 207, the provider of the financial management system used to obtain the consumers financial data provides the seller advertisement space within the consumers account in the computing system implemented financial management system and, in one embodiment, on the consumer's desktop, for a price based, at least in part, on the category, and/or attributes, and/or historical financial transaction data of the consumer who will receive the advertising as determined at IDENTIFY ONE OR MORE CONSUMERS HAVING DESIRABLE ATTRIBUTES USING THE CONSUMER'S FINANCIAL DATA OPERATION 205.

As noted above, in one embodiment, at IDENTIFY ONE OR MORE CONSUMERS HAVING DESIRABLE ATTRIBUTES USING THE CONSUMER'S FINANCIAL DATA OPERATION 205 the consumer's financial data obtained at OBTAIN CONSUMER'S FINANCIAL DATA OPERATION 203 is used to categorize consumers based on the consumer's financial transaction data and/or derived spending habits. In these embodiments access to entire categories of customers is provided at PROVIDE A SELLER ACCESS TO THE CONSUMER AT A PRICE BASED, AT LEAST IN PART, ON THE DESIRABLE ATTRIBUTES IDENTIFIED USING THE CONSUMER'S FINANCIAL DATA OPERATION 207.

In one embodiment, once one or more sellers are provided access to one or more of the consumers of IDENTIFY ONE OR MORE CONSUMERS HAVING DESIRABLE ATTRIBUTES USING THE CONSUMER'S FINANCIAL DATA OPERATION 205 by charging the sellers an amount based, in one embodiment, at least in part, on the consumer's category, and/or attributes, and/or historical financial transaction data at PROVIDE A SELLER ACCESS TO THE CONSUMER AT A PRICE BASED, AT LEAST IN PART, ON THE DESIRABLE ATTRIBUTES IDENTIFIED USING THE CONSUMER'S FINANCIAL DATA OPERATION 207, process flow proceeds to exit operation 230. In one embodiment, at EXIT OPERATION 230, process for providing sellers access to desirable consumers 200 is exited to await new data.

Using process for providing sellers access to desirable consumers 200, consumer financial transaction data is used to identify particularly valuable consumers for a given seller and then the seller is charged a premium for access to that consumer. This is advantageous to both the providers of marketing and advertising tools, since they are able to charge more for access to desirable consumers, and to the seller, since the seller is provided access to these desirable consumers.

In one embodiment, a seller is first given access to consumers by a provider of marketing and advertising tools and/or a user of a process for providing sellers access to desirable consumers, in one embodiment, at an initial price that is typically relatively low or, in one embodiment, at no cost at all. The financial transaction data for these consumers is then obtained from one or more sources and periodically monitored, in one embodiment using a computing system implemented financial management system. In one embodiment, the seller is then charged an additional amount for consumers that make purchases from the seller, as indicated by monitoring the consumer's financial transaction data. In one embodiment, the additional amount paid by the seller is tiered based on the amount of business a consumer provides to the seller.

Figure 3:
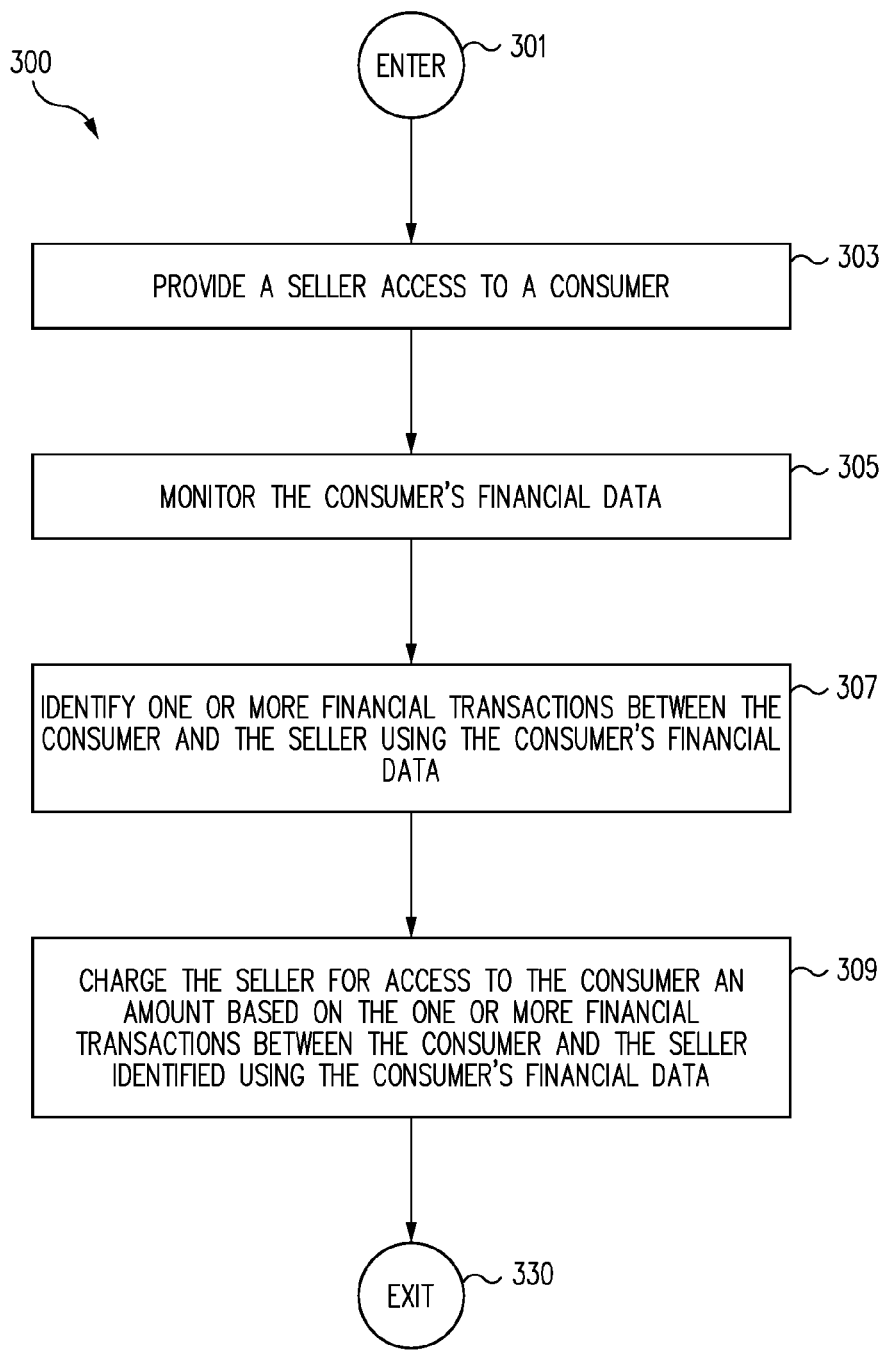
FIG. 3 is a flow chart depicting a process for providing sellers access to desirable consumers in accordance with one embodiment.

FIG. 3 a flow chart depicting a process for providing sellers access to desirable consumers 300 in accordance with one embodiment. Process for providing sellers access to desirable consumers 300 begins at ENTER OPERATION 301 of FIG. 3 and process flow proceeds to PROVIDE A SELLER ACCESS TO A CONSUMER OPERATION 303.

In one embodiment, at PROVIDE A SELLER ACCESS TO A CONSUMER OPERATION 303, one or more sellers are provided access to one or more of the consumers by providing the seller advertisement avenues and/or advertising space.

As noted above, traditionally, advertising has been done through printed media, visual media, television, radio, etc. As also noted above, with the advent of the Internet and electronic commerce, several new avenues for advertising have also been opened, including general and content-based advertising, typically on websites, computing system applications, and Internet search engines. Currently, some providers of computing system implemented applications, search engines, and/or websites offer sellers of consumer goods and services the opportunity to place advertisements at strategic locations within the applications and/or websites. In some cases, these advertisements appear based on content and/or other criteria. In addition, in some instances, sellers of consumer goods and services are charged based on the number of potential customers that view the sellers advertise and/or link or "click" to the sellers website. In these instances, using process for providing sellers access to desirable consumers 300, at PROVIDE A SELLER ACCESS TO A CONSUMER OPERATION 303 the seller is charged for access to the various consumers at an initial rate. In one embodiment, the initial rate is relatively small. In one embodiment, at PROVIDE A SELLER ACCESS TO A CONSUMER OPERATION 303 the seller is given access to the various consumers at no cost at all.

In one embodiment, an owner of a website is the provider of marketing and advertising tools and/or the user of process for providing sellers access to desirable consumers 300. In this instance, in one embodiment at PROVIDE A SELLER ACCESS TO A CONSUMER OPERATION 303, the website owner provides the sellers advertisement space within the website in a consumers account on the website for the initial price.

In one embodiment, an owner of a search engine is the provider of marketing and advertising tools and/or the user of process for providing sellers access to desirable consumers 200. In this instance, in one embodiment, at PROVIDE A SELLER ACCESS TO A CONSUMER OPERATION 303, the search engine owner provides the seller advertisement space within the search engine and/or result pages for the initial price.

In one embodiment, the provider of a computing system implemented financial management system that is used to monitor the consumers financial data at MONITOR THE CONSUMER'S FINANCIAL DATA OPERATION 305, as discussed in more detail below, is the provider of marketing and advertising tools and/or process for providing sellers access to desirable consumers 300. In this instance, in one embodiment at PROVIDE A SELLER ACCESS TO A CONSUMER OPERATION 303, the provider of the financial management system provides the seller advertisement space within the consumers account in the computing system implemented financial management system and, in one embodiment, on the consumer's desktop, for the initial price.

In one embodiment, once one or more sellers are provided access to one or more consumers by providing the seller advertisement avenues and/or advertising space at PROVIDE A SELLER ACCESS TO A CONSUMER OPERATION 303, process flow proceeds to MONITOR THE CONSUMER'S FINANCIAL DATA OPERATION 305.

In one embodiment, at MONITOR THE CONSUMER'S FINANCIAL DATA OPERATION 305 financial data representing various financial transactions conducted by the consumers of PROVIDE A SELLER ACCESS TO A CONSUMER OPERATION 303 is obtained by process for providing sellers access to desirable consumers 300 using, and/or through, and/or from, a computing system implemented financial management system and this financial data is monitored and/or reviewed to search for transactions between the consumer and the one or more sellers given access to the consumer at PROVIDE A SELLER ACCESS TO A CONSUMER OPERATION 303.

In one embodiment, the data representing financial transactions conducted by the consumers of PROVIDE A SELLER ACCESS TO A CONSUMER OPERATION 303 includes data associated with financial transactions conducted using multiple payment methods and/or accounts to provide as complete a set of consumer financial data as possible. For instance, in one embodiment, the consumer's financial transaction data is obtained at MONITOR THE CONSUMER'S FINANCIAL DATA OPERATION 305 from, but not limited to, any one or more of the following sources: banks; debit cards and/or accounts; credit unions; credit cards and/or accounts and/or credit card/account providers; asset accounts and/or asset account providers; or other financial resources, accounts and/or services used by a consumer to pay for and/or conduct financial transactions.

In addition, in some embodiments, the consumer's financial transaction data obtained at MONITOR THE CONSUMER'S FINANCIAL DATA OPERATION 305 is obtained from multiple sources of the same type. For instance, in one embodiment, the consumer's financial transaction data is obtained at MONITOR THE CONSUMER'S FINANCIAL DATA OPERATION 305 from: two or more banks; two or more debit cards and/or accounts; two or more credit unions; two or more credit cards and/or accounts and/or credit card/account providers; two or more asset accounts and/or asset account providers; and/or two or more other financial resources, accounts and/or services used by a consumer to pay for and/or conduct financial transactions.

As noted above, in one embodiment, all, or part, of the consumer's financial transaction data is obtained by process for providing sellers access to desirable consumers 300 at MONITOR THE CONSUMER'S FINANCIAL DATA OPERATION 305 from, or using, a computing system implemented financial management system, such as computing system implemented financial management system 180, that implements, includes, is accessed by, and/or is otherwise associated with process for providing sellers access to desirable consumers 300 (FIG. 3).

As noted above, currently, various computing system implemented financial management systems are available including: computing system implemented personal financial management systems; computing system implemented small business financial management systems; computing system implemented home inventory systems; computing system implemented tax preparation systems; computing system implemented business accounting systems; and computing system implemented medical expense management systems; as well as various other electronic data driven financial management systems.

As also noted above, computing system implemented financial management systems typically help consumers/users manage their finances by providing a centralized interface with banks, credit card companies, and other various financial institutions and/or accounts, for identifying, processing, storing, and categorizing consumer financial transactions and other consumer financial data. Currently, computing system implemented financial management systems typically obtain financial transaction information, such as payee identification, payee location, payment amount, date of the transaction, time of transaction, items purchased, the type of transaction, etc., via communication with banks, credit card providers, or other financial institutions, using electronic data transfer systems such as the Open Financial Exchange (OFX) specification, Web Direct, or various other systems for transferring financial transaction data.

As noted above, using computing system implemented financial management systems, the financial transaction information, payee identification, payee location, payment amount, date of the transaction, and other data is often used by the computing system implemented financial management system to categorize individual financial transactions as a particular type of income or expense. Some currently offered computing system implemented financial management systems then use this financial transaction information to track events, such as purchase events, and to provide various historical data reports or displays including "to date" data reports such as historical spending data reports in one or more particular categories.

In one embodiment, the consumer's financial transaction data obtained using one or more computing system implemented financial management systems is periodically transferred, or otherwise made available to, process for providing sellers access to desirable consumers 300 at MONITOR THE CONSUMER'S FINANCIAL DATA OPERATION 305.

In one embodiment, using the capabilities currently offered by computing system implemented financial management systems discussed above, at MONITOR THE CONSUMER'S FINANCIAL DATA OPERATION 305 process for providing sellers access to desirable consumers 300 searches the consumer financial data for transactions between the consumer and the one or more sellers given access to the consumer at PROVIDE A SELLER ACCESS TO A CONSUMER OPERATION 303.

In one embodiment, all, or part, of the consumer's financial transaction data is obtained by process for providing sellers access to desirable consumers 300 at MONITOR THE CONSUMER'S FINANCIAL DATA OPERATION 305 from invoices/bills and/or receipt data provided to process for providing sellers access to desirable consumers 300, and/or an associated computing system implemented financial management system, by one or more merchants and/or product and/or service providers. In one embodiment, the invoice/bill and/or receipt data includes "level 3" data indicating, among other things, the line item entry and product and/or service identification for each item purchased in the transaction.

As noted above, in one embodiment, process for providing sellers access to desirable consumers 300 is associated with a computing system implemented financial management system, such as computing system implemented financial management system 180 of FIG. 1, that implements, includes, is accessed by, and/or is otherwise associated with process for providing sellers access to desirable consumers 300 (FIG. 3). Some of these computing system implemented financial management systems provide the capability to obtain, receive, and/or process electronic copies of the invoices/receipts from one or more merchants and/or product and/or service providers, often in their specific formats, and then store the data for use by process for providing sellers access to desirable consumers 300 in one of numerous locations by one of numerous methods known to those of skill in the art and/or as discussed herein.

In one embodiment, using the data from invoices/receipts from one or more merchants and/or product and/or service providers and the capabilities currently offered by computing system implemented financial management systems discussed above, at MONITOR THE CONSUMER'S FINANCIAL DATA OPERATION 305 process for providing sellers access to desirable consumers 300 searches the consumer financial data for transactions between the consumer and the one or more sellers given access to the consumer at PROVIDE A SELLER ACCESS TO A CONSUMER OPERATION 303.

In one embodiment, all, or part, of the consumer's financial transaction data is obtained by process for providing sellers access to desirable consumers 300, and/or a computing system implemented financial management system, at MONITOR THE CONSUMER'S FINANCIAL DATA OPERATION 305 from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to pay for and/or conduct financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to pay for and/or conduct financial transactions.

In one embodiment, all, or part, of the consumer's financial transaction data is obtained by process for providing sellers access to desirable consumers 300 at MONITOR THE CONSUMER'S FINANCIAL DATA OPERATION 305 from user input through a user interface device such as keyboard 107, 157, mouse 111, 161 of FIG. 1 or a touchpad, voice command recognition system, or any other device capable of providing user input to a computing system or for translating user actions into computing system operations, whether available or known at the time of filing or as developed later.

Returning to FIG. 3, in one embodiment, all, or part, of the consumer's financial transaction data is obtained by process for providing sellers access to desirable consumers 300 at MONITOR THE CONSUMER'S FINANCIAL DATA OPERATION 305 from any combination of the above sources and/or from any other source of a consumer's financial data whether known at the time of filing or as developed thereafter.

In one embodiment, once the consumer's financial data is obtained at MONITOR THE CONSUMER'S FINANCIAL DATA OPERATION 305, the data is stored in whole, or in part, in a database maintained by, accessible by, owned by, or otherwise related to: process for providing sellers access to desirable consumers 300, and/or a provider of process for providing sellers access to desirable consumers 300; a computing system implemented financial management system, and/or a provider of a computing system implemented financial management system; one or more sellers; or any other party, by any one of the numerous mechanisms known to those of skill in the art. For instance, in one embodiment, the data, in whole, or in part, is stored in a memory system, such as memory systems 103 and 153 or server memory system 133, or database 170, of FIG. 1, or in a cache memory, such as cache memories 103A/153A of FIG. 1, or in any main memory or mass memory, associated with a computing system, such as computing systems 100 or 150 described above. In one embodiment, the data, in whole, or in part, is stored in any computing system and/or server system, such as computing systems 100 or 150 or server system 130, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 3, in some embodiments, the consumer's financial data stored as described above is maintained, in whole, or in part, by: process for providing sellers access to desirable consumers 300, and/or a provider of process for providing sellers access to desirable consumers 300; a computing system implemented financial management system, and/or a provider of a computing system implemented financial management system; one or more providers of marketing and advertising tools; a third party data storage institution; any third party service or institution; or any other parties. In these embodiments, access to the consumer's financial data is then provided to process for providing sellers access to desirable consumers 300, and/or a computing system implemented financial management system, by providing access to the data and/or providing the data on a computer program product.

In one embodiment, once financial data representing various financial transactions conducted by a given consumer is obtained and searched/monitored for transactions between the consumer and the one or more sellers given access to the consumer at PROVIDE A SELLER ACCESS TO A CONSUMER OPERATION 303 by process for providing sellers access to desirable consumers 300 using/from a computing system implemented financial management system at MONITOR THE CONSUMER'S FINANCIAL DATA OPERATION 305, process flow proceeds to IDENTIFY ONE OR MORE FINANCIAL TRANSACTIONS BETWEEN THE CONSUMER AND THE SELLER USING THE CONSUMER'S FINANCIAL DATA OPERATION 307.

In one embodiment, at IDENTIFY ONE OR MORE FINANCIAL TRANSACTIONS BETWEEN THE CONSUMER AND THE SELLER USING THE CONSUMER'S FINANCIAL DATA OPERATION 307, as a result of search of the consumer financial data at MONITOR THE CONSUMER'S FINANCIAL DATA OPERATION 305, one or transactions between the consumer and the one or more sellers given access to the consumer at PROVIDE A SELLER ACCESS TO A CONSUMER OPERATION 303 are identified.

In one embodiment, the one or transactions between the consumer and the one or more sellers given access to the consumer at PROVIDE A SELLER ACCESS TO A CONSUMER OPERATION 303 are identified at IDENTIFY ONE OR MORE FINANCIAL TRANSACTIONS BETWEEN THE CONSUMER AND THE SELLER USING THE CONSUMER'S FINANCIAL DATA OPERATION 307 via automatic monitoring of the consumer transactions of MONITOR THE CONSUMER'S FINANCIAL DATA OPERATION 305 and/or an alert system.

In one embodiment, the one or transactions between the consumer and the one or more sellers given access to the consumer at PROVIDE A SELLER ACCESS TO A CONSUMER OPERATION 303 are identified at IDENTIFY ONE OR MORE FINANCIAL TRANSACTIONS BETWEEN THE CONSUMER AND THE SELLER USING THE CONSUMER'S FINANCIAL DATA OPERATION 307 via automatic periodic scanning of the consumer transactions MONITOR THE CONSUMER'S FINANCIAL DATA OPERATION 305.

In one embodiment, the one or transactions between the consumer and the one or more sellers given access to the consumer at PROVIDE A SELLER ACCESS TO A CONSUMER OPERATION 303 are identified at IDENTIFY ONE OR MORE FINANCIAL TRANSACTIONS BETWEEN THE CONSUMER AND THE SELLER USING THE CONSUMER'S FINANCIAL DATA OPERATION 307 via periodic scanning of the consumer transactions MONITOR THE CONSUMER'S FINANCIAL DATA OPERATION 305 that are performed on demand.

In one embodiment, data representing the one or transactions between the consumer and the one or more sellers given access to the consumer at PROVIDE A SELLER ACCESS TO A CONSUMER OPERATION 303 identified at IDENTIFY ONE OR MORE FINANCIAL TRANSACTIONS BETWEEN THE CONSUMER AND THE SELLER USING THE CONSUMER'S FINANCIAL DATA OPERATION 307 is stored by any of the mechanisms known in the art and/or discussed herein and/or as developed after the time filing.

In one embodiment, once one or transactions between the consumer and the one or more sellers given access to the consumer at PROVIDE A SELLER ACCESS TO A CONSUMER OPERATION 303 are identified at IDENTIFY ONE OR MORE FINANCIAL TRANSACTIONS BETWEEN THE CONSUMER AND THE SELLER USING THE CONSUMER'S FINANCIAL DATA OPERATION 307, process flow proceeds to CHARGE THE SELLER FOR ACCESS TO THE CONSUMER AN AMOUNT BASED ON THE ONE OR MORE FINANCIAL TRANSACTIONS BETWEEN THE CONSUMER AND THE SELLER IDENTIFIED USING THE CONSUMER'S FINANCIAL DATA OPERATION 309.

In one embodiment, at CHARGE THE SELLER FOR ACCESS TO THE CONSUMER AN AMOUNT BASED ON THE ONE OR MORE FINANCIAL TRANSACTIONS BETWEEN THE CONSUMER AND THE SELLER IDENTIFIED USING THE CONSUMER'S FINANCIAL DATA OPERATION 309 the one or more sellers are charged for consumers that make purchases from the seller, as indicated by the consumer's financial transaction data.

In one embodiment, the amount charged to the seller at CHARGE THE SELLER FOR ACCESS TO THE CONSUMER AN AMOUNT BASED ON THE ONE OR MORE FINANCIAL TRANSACTIONS BETWEEN THE CONSUMER AND THE SELLER IDENTIFIED USING THE CONSUMER'S FINANCIAL DATA OPERATION 309 is predefined. For instance, a seller is asked to agree to pay a bonus amount to the provider of marketing and advertising tools and/or user of process for providing sellers access to desirable consumers 300 in the event a consumer does business with the seller as indicated by the monitoring of MONITOR THE CONSUMER'S FINANCIAL DATA OPERATION 305 and identified at IDENTIFY ONE OR MORE FINANCIAL TRANSACTIONS BETWEEN THE CONSUMER AND THE SELLER USING THE CONSUMER'S FINANCIAL DATA OPERATION 307.

In one embodiment, the amount charged to the seller at CHARGE THE SELLER FOR ACCESS TO THE CONSUMER AN AMOUNT BASED ON THE ONE OR MORE FINANCIAL TRANSACTIONS BETWEEN THE CONSUMER AND THE SELLER IDENTIFIED USING THE CONSUMER'S FINANCIAL DATA OPERATION 309 is predefined and tired based on the amount of business a given consumer conducts with a seller. For instance, a seller is asked to agree to pay a first bonus amount to the provider of marketing and advertising tools and/or user of process for providing sellers access to desirable consumers 300 in the event a consumer does a threshold amount of business with the seller and second bonus amount to the provider of marketing and advertising tools and/or user of process for providing sellers access to desirable consumers 300 in the event a consumer does a second threshold amount of business with the seller as indicated by the monitoring of MONITOR THE CONSUMER'S FINANCIAL DATA OPERATION 305 and identified at IDENTIFY ONE OR MORE FINANCIAL TRANSACTIONS BETWEEN THE CONSUMER AND THE SELLER USING THE CONSUMER'S FINANCIAL DATA OPERATION 307.

In one embodiment, the amount charged to the seller at CHARGE THE SELLER FOR ACCESS TO THE CONSUMER AN AMOUNT BASED ON THE ONE OR MORE FINANCIAL TRANSACTIONS BETWEEN THE CONSUMER AND THE SELLER IDENTIFIED USING THE CONSUMER'S FINANCIAL DATA OPERATION 309 is a predefined percentage of the business a consumer conducts with a seller. For instance, a seller is asked to agree to pay a percentage to the provider of marketing and advertising tools and/or user of process for providing sellers access to desirable consumers 300 of the dollar amount of business the seller receives from the consumer as indicated by the monitoring of MONITOR THE CONSUMER'S FINANCIAL DATA OPERATION 305 and identified at IDENTIFY ONE OR MORE FINANCIAL TRANSACTIONS BETWEEN THE CONSUMER AND THE SELLER USING THE CONSUMER'S FINANCIAL DATA OPERATION 307.

In one embodiment, the amount charged to the seller at CHARGE THE SELLER FOR ACCESS TO THE CONSUMER AN AMOUNT BASED ON THE ONE OR MORE FINANCIAL TRANSACTIONS BETWEEN THE CONSUMER AND THE SELLER IDENTIFIED USING THE CONSUMER'S FINANCIAL DATA OPERATION 309 is a predefined and tired percentage based of amount of business a given consumer conducts with a seller as indicated by the monitoring of MONITOR THE CONSUMER'S FINANCIAL DATA OPERATION 305 and identified at IDENTIFY ONE OR MORE FINANCIAL TRANSACTIONS BETWEEN THE CONSUMER AND THE SELLER USING THE CONSUMER'S FINANCIAL DATA OPERATION 307.

In one embodiment, the amount charged to the seller at CHARGE THE SELLER FOR ACCESS TO THE CONSUMER AN AMOUNT BASED ON THE ONE OR MORE FINANCIAL TRANSACTIONS BETWEEN THE CONSUMER AND THE SELLER IDENTIFIED USING THE CONSUMER'S FINANCIAL DATA OPERATION 309 is any amount and/or payment scheme agreed to by the seller and the provider of marketing and advertising tools and/or user of process for providing sellers access to desirable consumers 300 as determined by the monitoring of MONITOR THE CONSUMER'S FINANCIAL DATA OPERATION 305 and identified at IDENTIFY ONE OR MORE FINANCIAL TRANSACTIONS BETWEEN THE CONSUMER AND THE SELLER USING THE CONSUMER'S FINANCIAL DATA OPERATION 307.

In one embodiment, once the one or more sellers are charged for consumers that make purchases from the seller, as indicated by the consumer's financial transaction data at CHARGE THE SELLER FOR ACCESS TO THE CONSUMER AN AMOUNT BASED ON THE ONE OR MORE FINANCIAL TRANSACTIONS BETWEEN THE CONSUMER AND THE SELLER IDENTIFIED USING THE CONSUMER'S FINANCIAL DATA OPERATION 309, process flow proceeds to exit operation 330. In one embodiment, at EXIT OPERATION 330, process for providing sellers access to desirable consumers 300 is exited to await new data.

Using process for providing sellers access to desirable consumers 300, sellers are given access to various "unproven" consumers at a relatively low price and then are charged based on actual spending by a given consumer as indicated by the consumer's financial transaction data. This is advantageous to both the providers of marketing and advertising tools, since they are able to charge more for "proven" consumers, and to the seller, since the seller is provided access to a variety of consumers relatively cheaply and then only charged a premium for actual business generated.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "monitoring", "charging", "defining", "searching", "finding", "alerting", "accessing", "analyzing", "obtaining", "deriving", "determining", "collecting", "creating", "identifying", "transferring", "storing", "comparing", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithm-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for providing sellers access to desirable consumers comprising:
   one or more processors; and
   one or more memories coupled to the one or more processors, the one or more memories having stored therein instructions which when executed by the one or more processors perform a process for providing sellers access to desirable consumers comprising:
   obtaining a first set of financial data associated with a consumer from a computing system implemented financial management system, the first set of financial data comprising historical transactions involving the consumer but not involving a given seller;
   analyzing the first set of financial data to determine a desirability category associated with the consumer, the desirability category indicating a degree of desirability of the consumer with respect to the given seller, based on the historical transactions, wherein the degree of desirability is higher if the consumer has spent more than a threshold amount of money in a predefined timeframe on specific products or services, further wherein the degree of desirability is higher if the consumer has spent more than a threshold amount of money in a predefined timeframe in a specific category of store, and further wherein the degree of desirability is higher if the consumer has bought products or services from a particular seller more than a threshold number of times over a defined time frame;
   providing the given seller access to the consumer and charging the given seller a first fee for that access, the first fee being based at least in part on the desirability category associated with the consumer;
   obtaining a second set of financial data associated with the consumer from a computing system implemented financial management system;
   analyzing the second set of financial data associated with the consumer to identify one or more financial transactions between the given seller and the consumer, resulting in identified transactions; and charging the given seller a second fee for providing the given seller access to the consumer, the second fee being based, at least in part, on the identified transactions, the system being configured to further determine at least a portion of the second fee from a tiered system wherein the second fee is a first fee amount based on the consumer doing a first threshold amount of business with the seller, and wherein, in the tiered system, the second fee is a second fee amount higher than the first fee amount, based on the consumer doing a second threshold amount of business with the seller, the second threshold amount being higher than the first threshold amount.

2. The computing system implemented process for providing sellers access to desirable consumers of claim 1, wherein;
the computing system implemented financial management system is a computing system implemented personal financial management system.

3. The computing system implemented process for providing sellers access to desirable consumers of claim 1, wherein;
obtaining a first set of financial data associated with the consumer using a computing system implemented financial management system comprises obtaining at least part of the consumer's financial data from two or more of the following sources:
a bank;
a debit card account;
a credit union; or
a credit card account.

4. The computing system implemented process for providing sellers access to desirable consumers of claim 1, wherein;
providing the given seller access to a consumer comprises providing the given seller advertisement space.

5. The computing system implemented process for providing sellers access to desirable consumers of claim 4, wherein;
providing the given seller advertisement space comprises providing the given seller advertisement space in one of the following venues:
a website on a network;
a network search engine site;
a computing system implemented application;
a database.

6. A computer program product for providing a process for providing sellers access to desirable consumers comprising:
a nontransitory computer readable medium;
and computer program code, encoded on the computer readable medium, comprising computer readable instructions for:
obtaining a first set of financial data associated with a consumer from a computing system implemented financial management system, the first set of financial data comprising historical transactions involving the consumer but not involving a given seller;
analyzing the first set of financial data to determine a desirability category associated with the consumer, the desirability category indicating a degree of desirability of the consumer with respect to the given seller, based on the historical transactions associated with the consumer, wherein the degree of desirability is higher if the consumer has spent more than a threshold amount of money in a predefined timeframe on specific products or services, further wherein the degree of desirability is higher if the consumer has spent more than a threshold amount of money in a predefined timeframe in a specific category of store, and further wherein the degree of desirability is higher if the consumer has bought products or services from a particular seller more than a threshold number of times over a defined time frame;
providing the given seller access to the consumer and charging the given seller a first fee for that access, the first fee being based at least in part on the desirability category associated with the consumer;
obtaining a second set of financial data associated with the consumer from a computing system implemented financial management system;
analyzing the second set of financial data associated with the consumer to identify one or more financial transactions between the given seller and the consumer, resulting in identified transactions; and
charging the given seller a second fee for providing the given seller access to the consumer, the second fee being based, at least in part, on the identified transactions, the system being configured to further determine at least a portion of the second fee from a tiered system wherein the second fee is a first fee amount based on the consumer doing a first threshold amount of business with the seller, and wherein, in the tiered system, the second fee is a second fee amount higher than the first fee amount, based on the consumer doing a second threshold amount of business with the seller, the second threshold amount being higher than the first threshold amount.

7. The computer program product for providing a process for providing sellers access to desirable consumers of claim 6, wherein;
the computing system implemented financial management system is a computing system implemented personal financial management system.

8. The computer program product for providing a process for providing sellers access to desirable consumers of claim 6, wherein;
obtaining a first set of financial data associated with the consumer using a computing system implemented financial management system comprises obtaining at least part of the consumer's financial data from two or more of the following sources:
a bank;
a debit card account;
a credit union; or
a credit card account.

9. The computer program product for providing a process for providing sellers access to desirable consumers of claim 6, wherein;
providing the given seller access to a consumer comprises providing the given seller advertisement space.

10. The computer program product for providing a process for providing sellers access to desirable consumers of claim 9, wherein;
providing the given seller advertisement space comprises providing the given seller advertisement space in one of the following venues:
a website on a network;
a network search engine site;
a computing system implemented application;
a database.

11. A system for providing sellers access to desirable consumers comprising:
a computing system implemented financial management system; and
a processor for implementing at least a portion of a process for providing sellers access to desirable consumers, the process for providing sellers access to desirable consumers comprising:
obtaining a first set of financial data associated with a consumer from a computing system implemented financial management system, the first set of financial data comprising historical transactions involving the consumer but not involving a given seller;

analyzing the first set of financial data to determine a desirability category associated with the consumer, the desirability category indicating a degree of desirability of the consumer with respect to the given seller, based on the historical transactions, wherein the degree of desirability is higher if the consumer has spent more than a threshold amount of money in a predefined timeframe on specific products or services, further wherein the degree of desirability is higher if the consumer has spent more than a threshold amount of money in a predefined timeframe in a specific category of store, and further wherein the degree of desirability is higher if the consumer has bought products or services from a particular seller more than a threshold number of times over a defined time frame;

providing the given seller access to the consumer and charging the given seller a first fee for that access, the first fee being based at least in part on the desirability category associated with the consumer with respect to the given seller;

obtaining a second set of financial data associated with the consumer from a computing system implemented financial management system;

analyzing the financial data associated with the consumer to identify one or more financial transactions between the given seller and the consumer, resulting in identified transactions; and charging the given seller a second fee for providing the given seller access to the consumer, the second fee being based, at least in part, on the identified transactions, the system being configured to further determine at least a portion of the second fee from a tiered system wherein the second fee is a first fee amount based on the consumer doing a first threshold amount of business with the seller, and wherein, in the tiered system, the second fee is a second fee amount higher than the first fee amount, based on the consumer doing a second threshold amount of business with the seller, the second threshold amount being higher than the first threshold amount.

12. The system for providing sellers access to desirable consumers of claim 11, wherein;

providing the given seller access to the consumer comprises providing the seller advertisement space on one of the following venues:
a website on a network;
a network search engine site;
a computing system implemented application;
a database.

13. The system for providing sellers access to desirable consumers of claim 11, wherein;

obtaining a first set of financial data associated with the consumer using a computing system implemented financial management system comprises obtaining at least part of the consumer's financial data from two or more of the following sources:
a bank;
a debit card account;
a credit union; or
a credit card account.

* * * * *